United States Patent Office 3,028,399
Patented Apr. 3, 1962

3,028,399
ALPHA-SUBSTITUTED BETA-PROPIOLACTONES
Emilio Testa, San Simone, Vacallo, Ticino, Switzerland, assignor to Lepetit, S.p.A., Milan, Italy
No Drawing. Filed June 29, 1959, Ser. No. 823,334
Claims priority, application Great Britain July 17, 1958
4 Claims. (Cl. 260—343.9)

The present invention relates to the preparation of β-lactones. More particularly the invention is concerned with the preparation of β-lactones starting from β-aminopropionic acids:

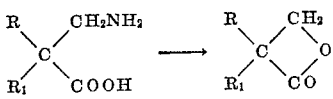

wherein R and $R_1$ are the same or different members of the class consisting of hydrogen, aryl, alkyl and aralkyl groups and polymethylene groups which are linked together to form a carbocyclic ring.

According to the process of the invention, one mole of a β-aminopropionic acid is reacted with about 2 to about 3 moles of an alkali metal nitrite in dilute acetic acid at a temperature below 5° C. If the product does not precipitate in the course of the reaction, the mixture is extracted with a water immiscible solvent and the solvent removed. The residue is the desired β-lactone, which can be purified, if desired, through conventional procedures. For instance, the product may be distilled through a column if it is an oil, or recrystallized from a selected solvent if it is a solid substance. Yields are usually fairly high. The lactones of the invention are useful as intermediate compounds for the preparation of a number of industrial products. For instance, they may be hydrolysed to the corresponding hydroxy acids:

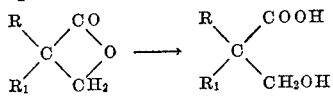

which are important intermediates in the synthesis of atropine and synthetic antispasmodics, as indicated in the British patent specification 709,585. The same hydroxy acids are starting compounds of our copending U.S. applications Serial Nos. 748,148, filed July 14, 1958 and 767,520, filed October 16, 1958, both now abandoned. These applications claim pharmacologically useful 5,5-disubstituted-tetrahydro - 1,3-oxazine-2,4-diones. Examples of conversion of the lactones into the hydroxy acids are given hereinbelow.

Moreover, when treated with ammonia under pressure in a solvent, the β-lactones are converted into the 2-acetidinones claimed in our copending U.S. applications Serial Nos. 731,635 and 731,637 both filed April 29, 1958, both now abandoned.

The following examples are illustrative of the invention.

EXAMPLE 1

α-Phenyl-α-Butylpropionolactone

Into a solution of 11 g. sodium nitrite in 30 ml. water, previously cooled to 0° C., a solution of 10 g. α-phenyl-α-butyl-β-aminopropionic acid in 125 ml. 25% aqueous acetic acid is gradually dropped taking care not to exceed 5° C. The mixture is stirred for 1.5 hours at 0–5° C., then it is extracted with three 100 ml. portions of ethyl ether. The extracts are combined, the solvent removed and the residue distilled collecting at 118–120° C./1 mm. Hg. Yield 7.5 g. (81%).

The obtained lactone may be hydrolysed to the hydroxy acid by heating it at about 100° for 30 minutes in 5% sodium hydroxide. After cooling the solution is extracted with ethyl ether, the extract discarded, the water layer made acidic with sulfuric acid and again extracted with ethyl ether. The organic solvent is removed and the residue treated with petroleum ether. The formed crystals are collected. Yield nearly quantitative. M.P. 75–78° C.

EXAMPLE 2

α-Phenyl-α-Ethylpropionolactone

Into a solution of 9.6 g. sodium nitrite in 25 ml. water a solution of 10 g. α-phenyl-α-ethyl-β-aminopropionic acid in 125 ml. 25% aqueous acetic acid at 0–5° C. is gradually dropped. After stirring for additional 90 minutes the mixture is extracted with ethyl ether, the solvent is removed and the residue distilled collecting at 105° C. under 1 mm. Hg. Yield 7.3 g. (80%).

When hydrolysed with dilute sodium hydroxide as described in Example 1, the compound gives α-phenyl-α-ethyl-β-hydroxypropionic acid, M.P. 96–98° C.

EXAMPLE 3

α-Phenyl-α-Methylpropionolactone

Into a solution of 9.6 g. sodium nitrite in 25 ml. water a solution of 10 g. α-phenyl-α-methyl-β-aminopropionic acid in 125 ml. 25% aqueous acetic acid is gradually dropped at 0–5° C. After stirring for an additional 90 minutes at 0–5° C. the mixture is extracted with ethyl ether, the solvent is removed and the residue distilled collecting at 75–80° C. under 0.6 mm. Hg. Yield 7.1 g. (79%).

When hydrolysed with dilute sodium hydroxide as described in Example 1, the compound gives α-phenyl-α-methyl-β-hydroxypropionic acid; M.P. 87–88° C.

EXAMPLE 4

α-Phenyl-α-Benzylpropionolactone

Into a solution of 6 g. sodium nitrite in 25 ml. water there is gradually dropped a solution of 10 g. α-phenyl-α-benzyl-β-aminopropionic acid in 300 ml. 50% aqueous acetic acid and 1.3 ml. sulfuric acid (to dissolve the amino acid, poorly soluble in acetic acid). A precipitate forms. After stirring for 45 minutes at 0–5° C. the crystals are collected by suction and dried. Yield 6.5 g. (70%); M.P. 124–125° C.

When hydrolysed with dilute sodium hydroxide as described in Example 1 the product gives α-phenyl-α-benzyl-β-hydroxypropionic acid; M.P. 191–193° C.

EXAMPLE 5

α-Phenylpropionolactone

Into a solution of 40 g. sodium nitrite in 120 ml. water, previously cooled to 0°, a solution of 20 g. α-phenyl-β-aminopropionic acid in 400 ml. 25% aqueous acetic acid is gradually dropped without exceeding 5° C. The mixture is stirred 30 minutes at 0–5°, then it is extracted with three 500 ml. portions of ethyl ether. The extracts are combined, the solvent removed and the residue distilled collecting at 95–100° C./1 mm. Hg. Yield 15 g. (83%).

When hydrolysed with NaOH as described in Example 1 this compound gives a nearly quantitative yield of tropic acid.

EXAMPLE 6

α,α-Diethylpropionolactone

Into a solution of 12 g. sodium nitrite in 75 ml. water, previously cooled to 0°, a solution of 11.2 g. α,α-diethyl-β-aminopropionic acid in 250 ml. 25% acetic acid is dropped at 0/5° C. After an additional 30 minutes at 0° the mixture is extracted with ethyl ether, the solvent removed and the residue distilled collecting at 70–75°/7 mm. Hg. Yield 8 g. (81%).

EXAMPLE 7

*α,α-Dipropylpropionolactone*

Prepared as described in Example 6 for the diethyl homologue. The product distils at 86–88°/5 mm. Hg. Yield 84%.

EXAMPLE 8

*α,α-Dibutylpropionolactone*

Prepared as described in Example 6 for the diethyl homologue. The product distils at 98–100°/3 mm. Yield 82%.

I claim:

1. A process for preparing β-lactones of the formula

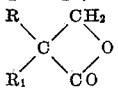

wherein R and R₁ are members of the class consisting of hydrogen, phenyl, alkyl and benzyl groups, which comprises mixing a β-aminopropionic acid of the formula

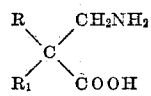

wherein R and R₁ have the above significance, with 2 to 3 equivalents of an alkali metal nitrite in dilute acetic acid at a temperature below 5° C.

2. A process for preparing β-lactones of the formula

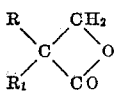

wherein R and R₁ are members of the class consisting of hydrogen, phenyl, alkyl and benzyl groups, which comprises mixing a β-aminopropionic acid of the formula

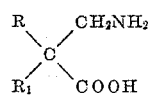

wherein R and R₁ have the above significance, with 2 to 3 equivalents of sodium nitrite in 25% aqueous acetic acid at a temperature below 5° C.

3. Process for preparing a β-lactone of the formula

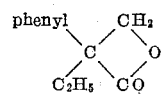

which comprises mixing alpha-phenyl-alpha-ethyl-beta-aminopropionic acid with two to three equivalents of an alkali metal nitrite in dilute acetic acid at a temperature below 5° C.

4. Process for preparing a β-lactone of the formula

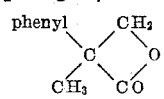

which comprises mixing alpha-phenyl-alpha-methyl-beta-aminopropionic acid with two to three equivalents of an alkali metal nitrite in dilute acetic acid at a temperature below 5° C.

References Cited in the file of this patent

UNITED STATES PATENTS

| | | |
|---|---|---|
| 2,449,994 | Gresham et al. | Sept. 28, 1948 |
| 2,739,158 | Caldwell | Mar. 20, 1956 |

FOREIGN PATENTS

| | | |
|---|---|---|
| 709,585 | Great Britain | May 26, 1954 |

OTHER REFERENCES

Adams (Ed.): Organic Reactions, vol. VIII, Wiley, New York, N.Y., (1954), page 311.